United States Patent
Morris et al.

(10) Patent No.: US 9,180,961 B2
(45) Date of Patent: Nov. 10, 2015

(54) CONTROL SURFACE FOR CREATING VARIABLE CAMBER ALONG A WING

(71) Applicant: The Boeing Company, Chicago, IL (US)

(72) Inventors: Charles Eugene Morris, Des Peres, MO (US); James Joseph Sheahan, Jr., Alton, IL (US)

(73) Assignee: THE BOEING COMPANY, Chicago, IL (US)

( * ) Notice: Subject to any disclaimer, the term of this patent is extended or adjusted under 35 U.S.C. 154(b) by 322 days.

(21) Appl. No.: 13/751,698

(22) Filed: Jan. 28, 2013

(65) Prior Publication Data

US 2014/0312168 A1    Oct. 23, 2014

(51) Int. Cl.
*B64C 3/48*    (2006.01)

(52) U.S. Cl.
CPC ........................................ *B64C 3/48* (2013.01)

(58) Field of Classification Search
CPC .......................................................... B64C 3/48
USPC ................................................ 244/219, 201
See application file for complete search history.

(56) References Cited

U.S. PATENT DOCUMENTS

| | | | |
|---|---|---|---|
| 3,378,217 A | | 4/1968 | Diani |
| 4,431,149 A | * | 2/1984 | Brislawn et al. ........... 244/99.14 |
| 4,765,572 A | | 8/1988 | Bellego et al. |
| 5,913,492 A | * | 6/1999 | Durandeau et al. ............. 244/82 |
| 6,257,528 B1 | | 7/2001 | Brislawn |
| 6,347,769 B1 | * | 2/2002 | To et al. ......................... 244/219 |
| 6,349,900 B1 | | 2/2002 | Uttley et al. |
| 6,481,667 B1 | | 11/2002 | Ho |
| 6,796,534 B2 | * | 9/2004 | Beyer et al. .................... 244/214 |
| 6,910,661 B2 | * | 6/2005 | Dockter et al. ................ 244/218 |
| 7,424,988 B2 | * | 9/2008 | McDonnell ...................... 244/82 |
| 7,530,533 B2 | * | 5/2009 | Perez-Sanchez ............. 244/219 |
| 7,699,270 B2 | * | 4/2010 | Lonsinger et al. ............ 244/219 |
| 7,918,421 B2 | * | 4/2011 | Voglsinger et al. ........... 244/219 |
| 8,083,179 B2 | * | 12/2011 | Hamilton et al. ............. 244/99.8 |
| 2002/0100842 A1 | * | 8/2002 | Perez ............................. 244/219 |
| 2006/0163431 A1 | * | 7/2006 | Dittrich ......................... 244/126 |
| 2007/0227433 A1 | * | 10/2007 | Lazar ............................. 114/271 |
| 2009/0146003 A1 | * | 6/2009 | Sheahan et al. ............. 244/99.14 |

OTHER PUBLICATIONS

Extended European Search Report, dated May 15, 2014, regarding Application No. EP14152720.0, 7 pages.

* cited by examiner

*Primary Examiner* — Justin Benedik

(74) *Attorney, Agent, or Firm* — Yee & Associates, P.C.

(57) ABSTRACT

An apparatus and method for controlling a shape of an outer surface of a control surface. In one illustrative embodiment, an apparatus comprises a control surface and a shaping system associated with the control surface. The control surface is associated with a portion of an aft edge of a wing. The control surface comprises a plurality of segments in which each of the plurality of segments comprises a number of sections. The shaping system is configured to move each segment in the plurality of segments independently of other segments in the plurality of segments to control a shape of an outer surface of the control surface.

18 Claims, 9 Drawing Sheets

CONTROL SURFACE FOR CREATING VARIABLE CAMBER ALONG A WING

GOVERNMENT LICENSE RIGHTS

This application was made with United States Government support under contract number NNL11AA05B awarded by the National Aeronautics and Space Administration. The United States Government has certain rights in this application.

BACKGROUND INFORMATION

1. Field

The present disclosure relates generally to control surfaces and, in particular, to control surfaces for the wings of aircraft. Still more particularly, the present disclosure relates to a control surface for the wing of an aircraft and a method for controlling a shape of the control surface.

2. Background

A control surface, which also may be referred to as a flight control surface, is a structure that is used to control the movement of an aircraft. Various types of control surfaces are used to control the movement of an aircraft by controlling lift, controlling drag, and/or controlling other aerodynamic forces generated during flight. These various types of control surfaces may include, but are not limited to, ailerons, flaps, spoilers, rudders, slats, elevators, and other types of control surfaces.

Oftentimes, flaps and ailerons are used on the wings of aircraft. For example, one or more flaps and/or one or more ailerons may be positioned along the aft edge of a wing. These flaps and ailerons may be deployed during flight to control the lift on the wing. In some cases, the flaps and ailerons may be positioned along the aft edge of the wing to control the distribution of lift on the wing.

Additionally, the flaps and ailerons may be used to control the camber along the wing. As used herein, "camber" is the asymmetry between the top and bottom surfaces of an airfoil. An airfoil is the cross-sectional shape that is obtained when a perpendicular plane intersects a wing. In some cases, the camber of an airfoil may also be referred to as the curvature of the airfoil.

The camber along the wings of an aircraft may affect the overall aerodynamic performance of the aircraft during flight. Consequently, having the ability to adjust the camber during flight may be desirable. However, some currently available control surfaces may be unable to provide the wings of an aircraft with the capability of varying the camber within a selected range. For example, varying the camber along the wings during flight may help reduce the amount of fuel consumed during flight. Further, varying the camber along the wings during flight may increase the range of flight for the aircraft. Therefore, it would be desirable to have a method and apparatus that takes into account at least some of the issues discussed above, as well as other possible issues.

SUMMARY

In one illustrative embodiment, an apparatus comprises a control surface and a shaping system associated with the control surface. The control surface is associated with a portion of an aft edge of a wing. The control surface comprises a plurality of segments in which each of the plurality of segments comprises a number of sections. The shaping system is configured to move each segment in the plurality of segments independently of other segments in the plurality of segments to control a shape of an outer surface of the control surface.

In another illustrative embodiment, a control surface comprises a plurality of segments and a plurality of elastomeric interfaces. Each segment in the plurality of segments is configured to be moved independently of other segments in the plurality of segments to control a shape of an outer surface of the control surface. The plurality of elastomeric interfaces is configured to form a portion of the outer surface of the control surface. The outer surface of the control surface is substantially continuous and smooth.

In yet another illustrative embodiment, a method is provided for controlling a shape of an outer surface of a control surface. A selected shape for the outer surface of the control surface is identified. The control surface comprises a plurality of segments in which each of the plurality of segments comprises a number of sections. The plurality of segments is moved such that a current shape of the outer surface of the control surface changes into the selected shape. Each of the plurality of segments is moved independently of other segments in the plurality of segments.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize that it may be desirable to have a single substantially continuous control surface for the wing of an aircraft that is capable of achieving the functionality that is currently provided by multiple control surfaces. Further, the illustrative embodiments recognize and take into account that it may be desirable to have a single substantially continuous control surface that is capable of improving the overall aerodynamic performance of an aircraft, reducing the amount of fuel consumed during flight, and increasing the range of flight for the aircraft.

Thus, the illustrative embodiments provide a control surface that can be used on the wing of an aircraft to replace the use of other control surfaces, such as flaps and ailerons. This control surface may be comprised of segments in which each segment may be independently moveable and controllable relative to the other segments. Further, each of the segments may be comprised of sections that are also independently moveable and controllable. In this manner, various shapes for the control surface may be achieved. The shape selected for the control surface may be selected to improve the aerodynamic performance of the aircraft during flight.

Figure 1:
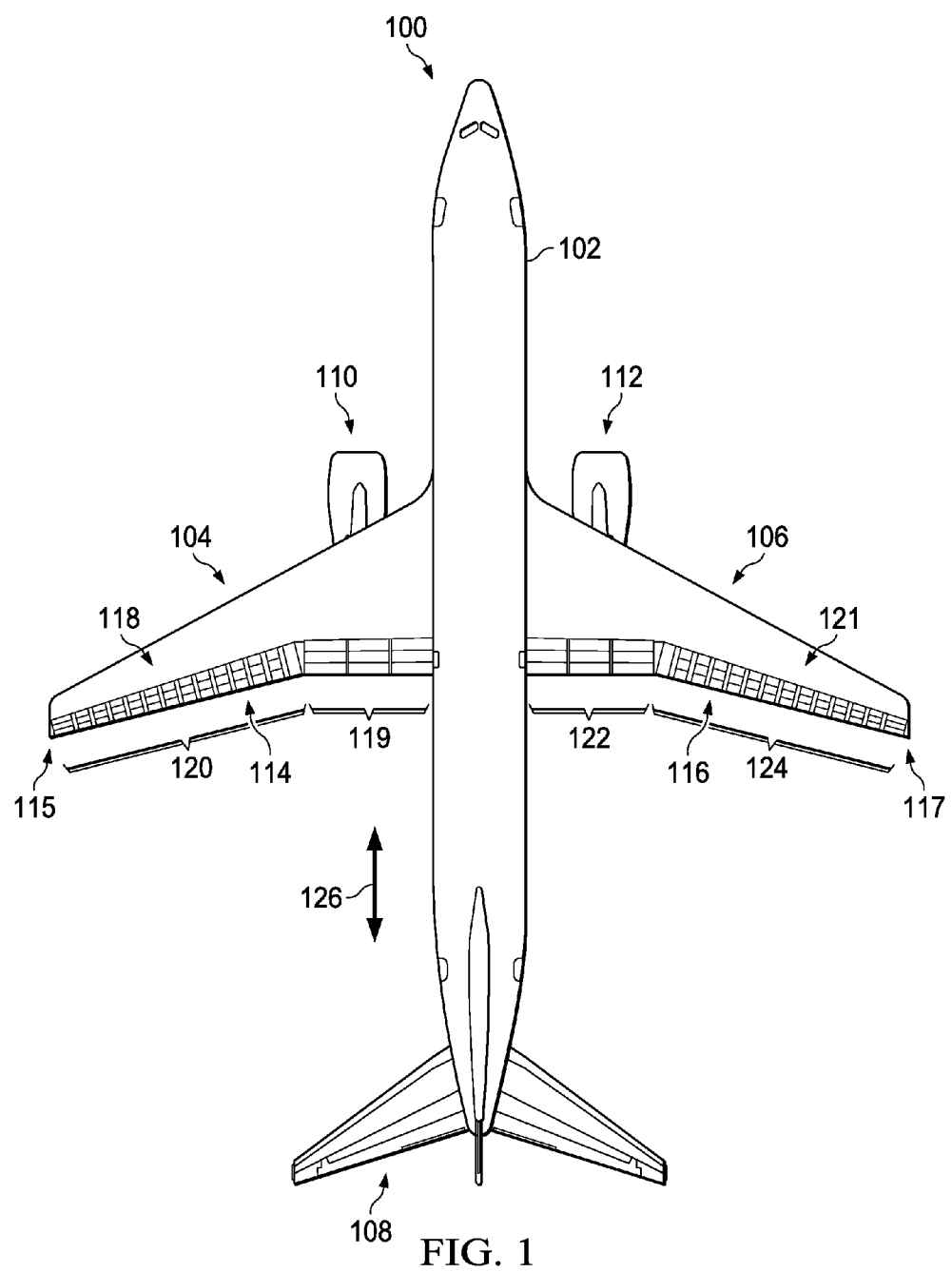
FIG. 1 is an illustration of a top view of an aircraft in accordance with an illustrative embodiment.

Referring now to the figures and, in particular, with reference to FIG. 1, an illustration of a top view of an aircraft is depicted in accordance with an illustrative embodiment. As depicted in FIG. 1, aircraft 100 includes fuselage 102, wing 104, wing 106, and tail section 108. Further, aircraft 100 also includes engine 110 and engine 112.

In this illustrative example, control surface 114 is associated with aft edge 115 of wing 104. Control surface 116 is associated with aft edge 117 of wing 106. In some cases, aft edge 115 and aft edge 117 may also be referred to as the trailing edges of wing 104 and wing 106, respectively.

As used herein, when one component is "associated" with another component, the association is a physical association. For example, a first component, such as control surface 114, may be considered to be associated with a second component, such as wing 104, by being secured to the second component, bonded to the second component, mounted to the second component, welded to the second component, fastened to the second component, and/or connected to the second component in some other manner. The first component also may be connected to the second component using a third component. In some cases, the first component may be considered to be associated with the second component by being formed as part of and/or an extension of the second component.

In this illustrative example, each of control surface 114 and control surface 116 is a substantially continuous control surface. As depicted, control surface 114 is comprised of a plurality of segments 118. A first portion of control surface 114, which may be the inboard portion of control surface 114, is formed by a plurality of inboard segments 119. A second portion of control surface 114, which may be the outboard portion of control surface 114, is formed by a plurality of outboard segments 120.

Similarly, control surface 116 may be comprised of a plurality of segments 121. As depicted, a first portion of control surface 116, which may be the inboard portion of control surface 116, is formed by a plurality of inboard segments 122. A second portion of control surface 116, which may be the outboard portion of control surface 116, is formed by a plurality of outboard segments 124.

Each of segments 118 of control surface 114 and each of segments 121 of control surface 116 may be independently operable with respect to the other segments. In other words, each of segments 118 may be operated independently of the other segments in control surface 114. Further, each of segments 121 may be operated independently of the other segments in control surface 116.

For example, one of segments 118 may be operated such that the outer surface of the segment has a different curvature in forward-aft direction 126 than at least one other segment of control surface 114. In this manner, each of segments 118 may be operated such that the camber along wing 104 is varied. The curvature of each of segments 118 in forward-aft direction 126 may be controlled such that the overall shape of the outer surface of control surface 114 may be controlled.

In this manner, the overall shape of the outer surface of control surface 114 and control surface 116 may be controlled to control the overall shape of wing 104 and wing 106, respectively. By varying the camber along wing 104 and wing 106, control surface 114 and control surface 116, respectively, may be used to improve the overall aerodynamic performance of aircraft 100 during flight. Control surface 114 is described in greater detail in FIG. 2 below.

Figure 2:
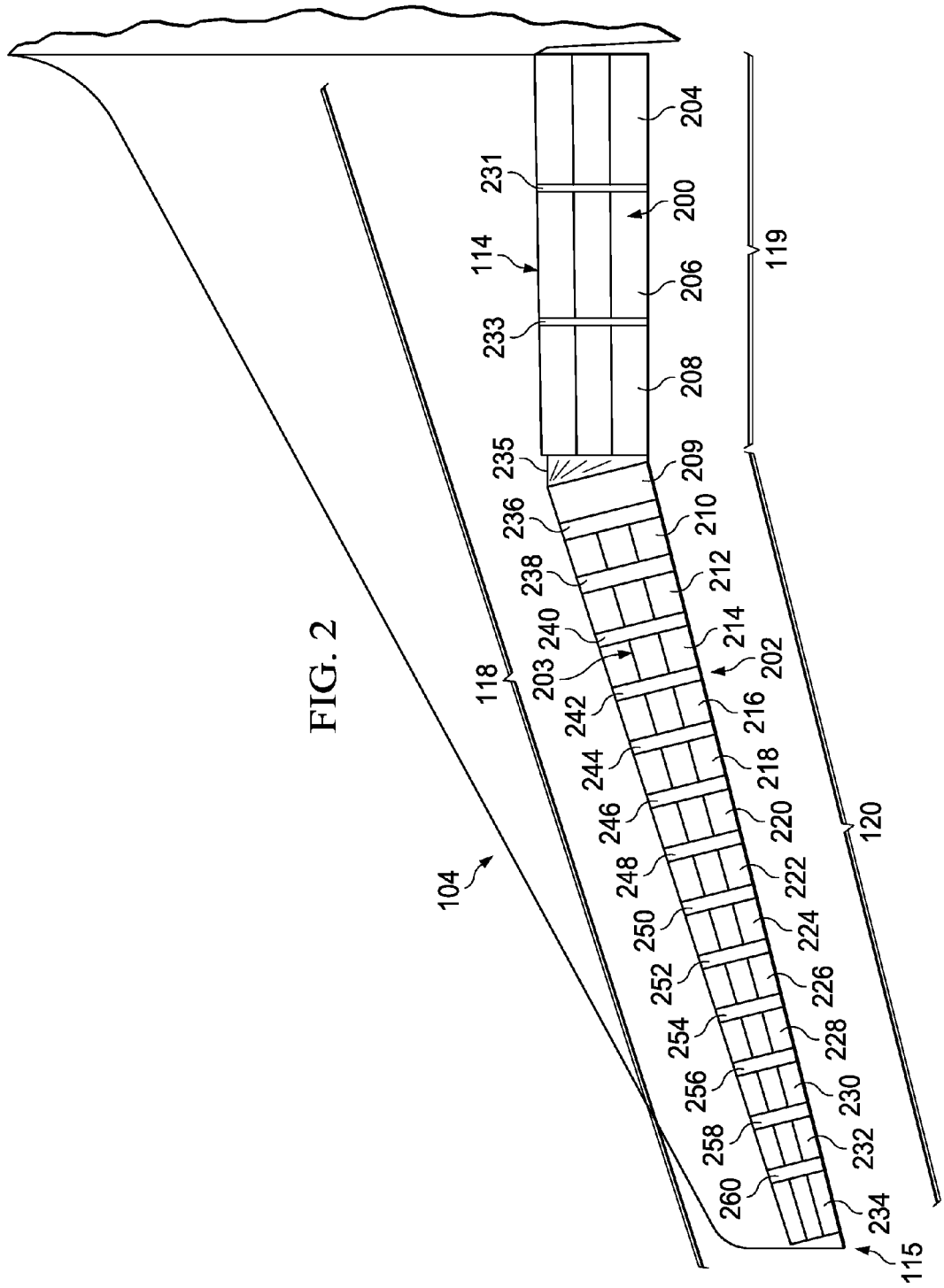
FIG. 2 is an illustration of a top view of a wing of an aircraft in accordance with an illustrative embodiment.

With reference now to FIG. 2, an illustration of a top view of wing 104 of aircraft 100 from FIG. 1 is depicted in accordance with an illustrative embodiment. As depicted, all of segments 118 of control surface 114 are arranged substantially continuously along aft edge 115 of wing 104. In other words, outer surface 200 of control surface 114 is substantially continuous. Further, outer surface 200 of control surface 114 is substantially smooth in this illustrative example.

In this illustrative example, inboard segments 119 include segments 204, 206, and 208. Outboard segments 120 include segments 209, 210, 212, 214, 216, 218, 220, 222, 224, 226, 228, 230, 232, and 234. The outer surface of each of inboard segments 119 and each of outboard segments 120 may form a portion of outer surface 200.

Further, a portion of outer surface 200 may be formed by a plurality of elastomeric interfaces 202 between segments 118. Elastomeric interfaces 202 include elastomeric interfaces 231, 233, 235, 236, 238, 240, 242, 244, 246, 248, 250, 252, 254, 256, 258, and 260. For example, elastomeric interface 233 forms the portion of outer surface 200 between segment 206 and segment 208.

Each of elastomeric interfaces 202 may be comprised of elastomeric material. An elastomeric material is a polymer that has viscoelastic properties. In other words, an elastomeric material has both viscous properties and elastic properties. A viscous material may resist shear flow and strain linearly with time when a stress is applied. An elastic material may strain instantaneously when stretched and may quickly return to the original state once the stress is removed.

In this illustrative example, elastomeric interfaces 202 may be comprised of, for example, without limitation, one or more of rubber, a silicone rubber formation, or some other type of elastomeric material. Further, each of elastomeric interfaces 202 may be comprised of any number of strengthening and/or stiffening materials that may allow the elastomeric interface to maintain structural integrity and perform in a desired manner during the flight of aircraft 100.

Segments 118 may be operated such that segments 118 are moved relative to each other. In particular, each of segments 118 may be moved independently of the other segments. Elastomeric interfaces 202 allow outer surface 203 of control surface 114 to remain substantially smooth as segments 118 move relative to each other. In this manner, disruption to the airflow over wing 104 and control surface 114 may be reduced to within selected tolerances.

Figure 3:
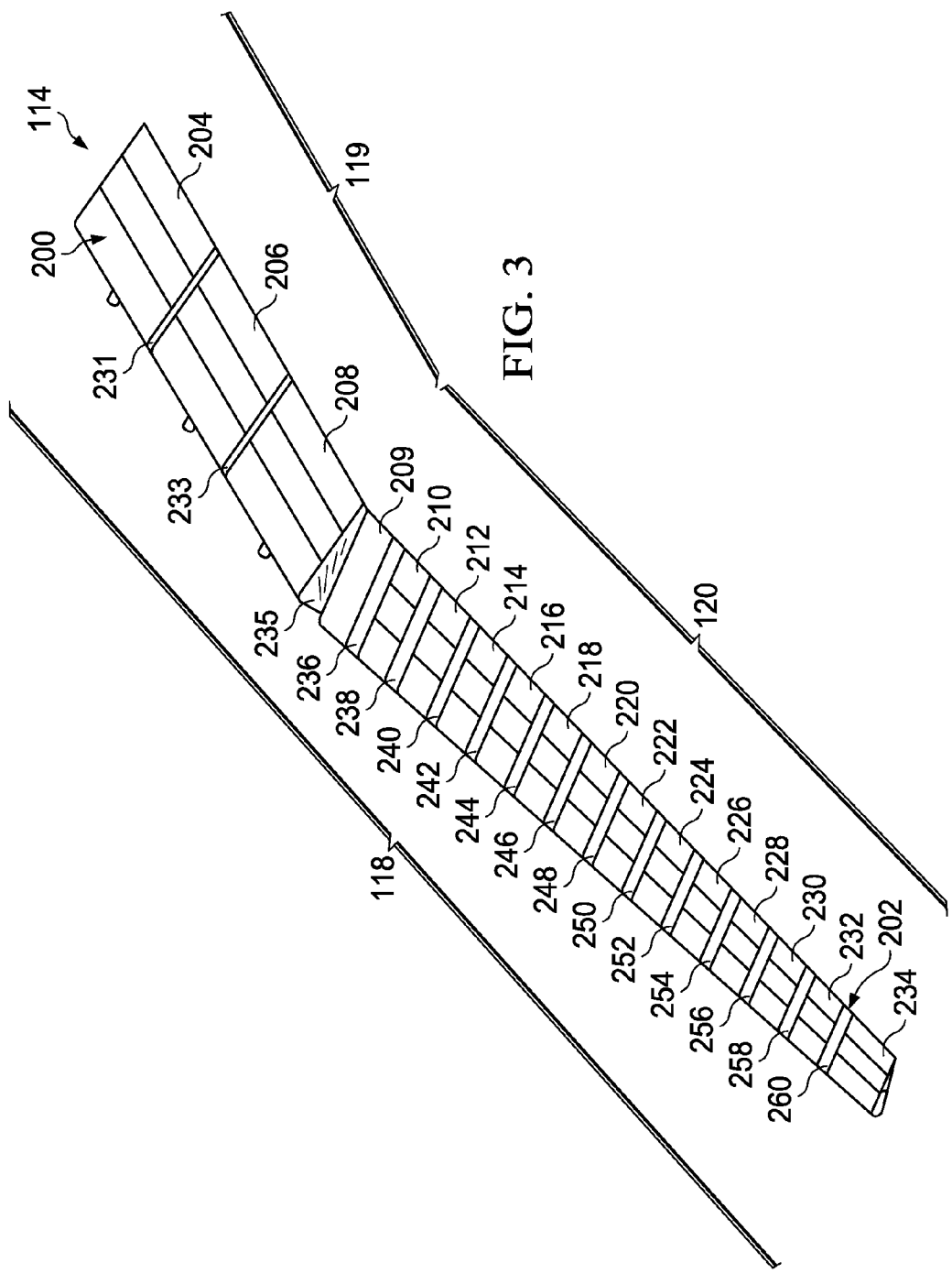
FIG. 3 is an illustration of an isometric view of a control surface in accordance with an illustrative embodiment.

Turning now to FIG. 3, an illustration of an isometric view of control surface 114 from FIGS. 1-2 is depicted in accordance with an illustrative embodiment. In FIG. 3, control surface 114 is depicted without wing 104 in FIG. 2. As depicted, outer surface 200 of control surface 114 remains substantially continuous and smooth.

Figure 4:
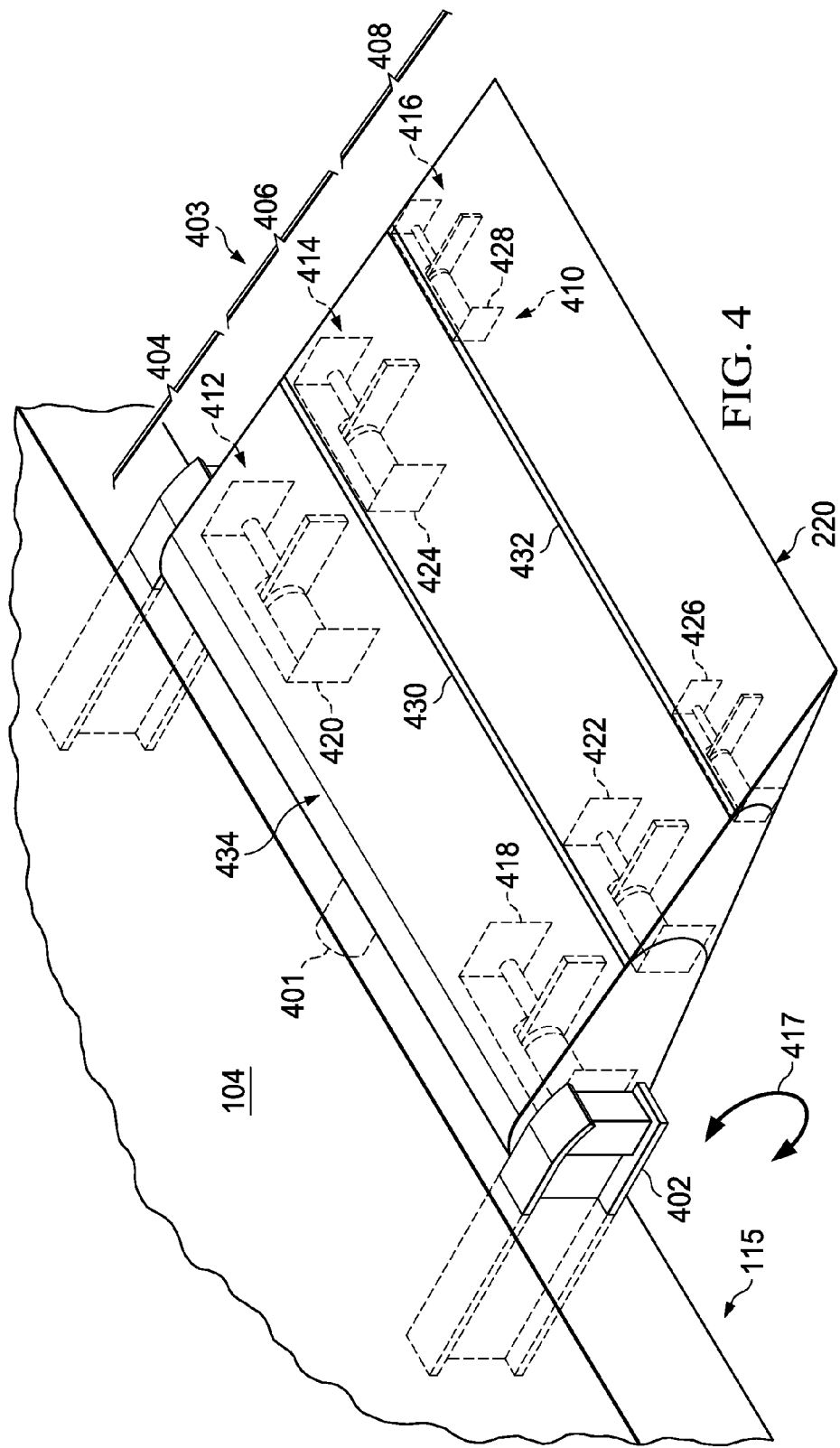
FIG. 4 is an illustration of a phantom view of a segment in accordance with an illustrative embodiment.

With reference now to FIG. 4, an illustration of a phantom view of segment 220 from FIGS. 2-3 is depicted in accordance with an illustrative embodiment. In FIG. 4, segment 220 is depicted as an example of the manner in which each of segments 118 from FIGS. 1-3 may be implemented.

As depicted, segment 220 is connected to aft edge 115 of wing 104. Segment 220 may be moved between a stowed state and a deployed state by motor 401 and rail system 402. In particular, motor 401 may be used to move segment 220 along rail system 402 in this example. Segment 220 is stowed by moving segment 220 in a direction towards wing 104 along rail system 402. Segment 220 is deployed by moving segment 220 in a direction away from wing 104 along rail system 402.

In this illustrative example, segment 220 is comprised of a number of sections 403. As used herein, a "number of items" may be one or more items. In this manner, a number of sections may be one or more sections. In this illustrative example, segment 220 comprises three of sections 403. Sections 403 include section 404, section 406, and section 408. Each of sections 403 may be operated independently of the other sections that form segment 220. In particular, each of sections 403 may be moved independently of the other sections of segment 220.

As depicted, segment 220 is associated with actuation system 410. Actuation system 410 may be considered part of segment 220 in this illustrative example. Actuation system 410 is used to operate and move segment 220. In this illustrative example, each of segments 118 from FIGS. 1-3 may have an actuation system implemented in a manner similar to actuation system 410. These actuation systems form a shaping system for control surface 114 from FIGS. 1-3.

Actuation system 410 comprises a number of section mechanisms that include, section mechanism 412, section mechanism 414, and section mechanism 416. Each of these section mechanisms is configured to move a corresponding section in sections 403 independently of the other sections.

In particular, section mechanism 412 is configured to move section 404 independently of section 406 and section 408. Section mechanism 414 is configured to move section 406 independently of section 404 and section 408. Section mechanism 416 is configured to move section 408 independently of section 406 and section 404.

In this illustrative example, section mechanism 412 comprises actuator 418 associated with the outboard end of section 404 and actuator 420 associated with the inboard end of section 404. Section mechanism 414 comprises actuator 422 associated with the outboard end of section 406 and actuator 424 associated with the inboard end of section 406. Further, section mechanism 416 comprises actuator 426 associated with the outboard end of section 408 and actuator 428 associated with the inboard end of section 408.

Actuators 418, 420, 422, 424, 426, and 428 take the form of shape-memory alloy (SMA) rotary actuators in this illustrative example. However, in other illustrative examples, actuation system 410 may be implemented using any number of different types of actuators. For example, actuation system 410 may comprise at least one of a hydraulic actuator, a pneumatic actuator, a rotary actuator, a linear actuator, an electric actuator, a shape-memory alloy actuator, a shape-memory alloy rotary actuator and other types of actuators.

As used herein, the phrase "at least one of," when used with a list of items, means different combinations of one or more of the listed items may be used. In some cases, only one item of the list of items may be needed. As one illustrative example, "at least one of item A, item B, and item C" may include item A, may include item A and item B, may include item A, item B, and item C, or may include item B and item C. In other examples, "at least one of item A, item B, and item C" may include, for example, without limitation, two of item A, one of item B, and ten of item C; four of item B and seven of item C; or some other type of combination.

Each of actuators 418, 420, 422, 424, 426, and 428 may be configured to rotate the corresponding end of the section with which the actuator is associated in the direction of arrow 417. Depending on the manner in which these actuators are operated, each of sections 403 may be rotated, twisted, and/or manipulated in some other manner.

In this illustrative example, the outer surfaces of each of section 404, section 406, and section 408 form a portion of outer surface 434 of segment 220. A number of elastomeric interfaces may be located between sections 403. For example, elastomeric interface 430 is located between section 404 and section 406. Elastomeric interface 432 is located between section 406 and section 408.

Both elastomeric interface 430 and elastomeric interface 432 form a portion of outer surface 434 of segment 220. Each of elastomeric interface 430 and elastomeric interface 432 may be comprised of an elastomeric material. Elastomeric interface 430 and elastomeric interface 432 ensure that outer surface 434 of segment 220 remains substantially smooth and continuous as one or more of sections 403 are moved.

In this manner, control surface 114 in FIG. 1 may include a plurality of elastomeric interfaces in which a first portion of these elastomeric interfaces are located between segments 118 and in which a second portion of these elastomeric interfaces are located between the number of sections that form each of segments 118.

Figure 5:
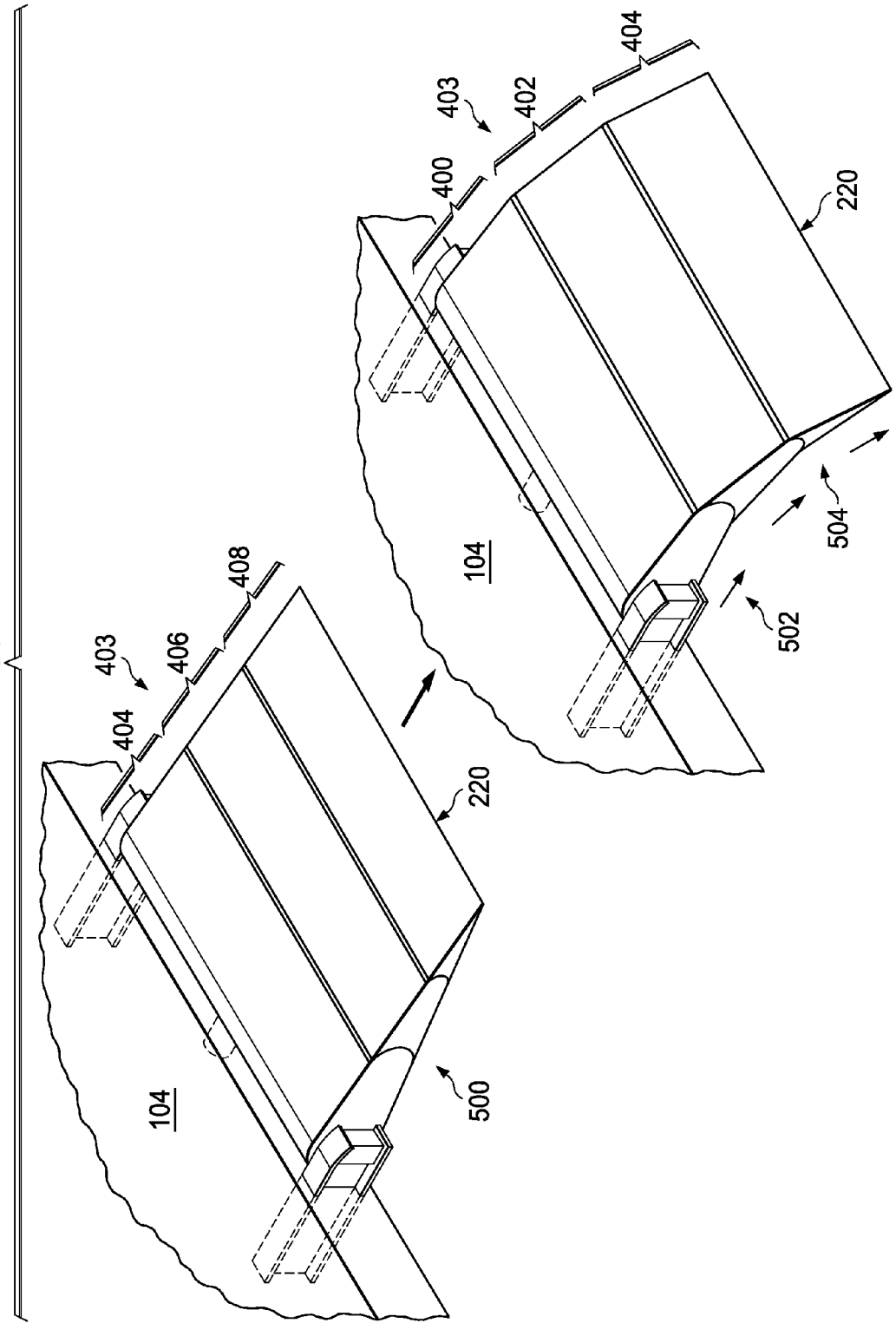
FIG. 5 is an illustration of a segment being moved in accordance with an illustrative embodiment.

With reference now to FIG. 5, an illustration of segment 220 from FIG. 4 being moved is depicted in accordance with an illustrative embodiment. In this illustrative example, segment 220 is depicted having initial position 500.

Actuation system 410 (not shown in this view) from FIG. 4 may be operated to move segment 220 from initial position 500 to new position 504. In particular, section mechanism 412, section mechanism 414, and section mechanism 416 (not shown in this view) of actuation system 410 from FIG. 4 may be operated to move section 404, section 406, and section 408, respectively, in the direction of arrows 502 into new position 504.

In this illustrative example, each of segments 118 in FIG. 1 may be moved using an actuation system implemented in a manner similar to actuation system 410 in FIG. 4. Depending on the implementation, each of the sections in segments 118 may be rotated to the same and/or different degrees such that control surface 114 from FIGS. 1-3 may have a selected shape. The selected shape may be, for example, without limitation, a varying curvature along outer surface 200 of control surface 114 in FIG. 1.

Figure 6:
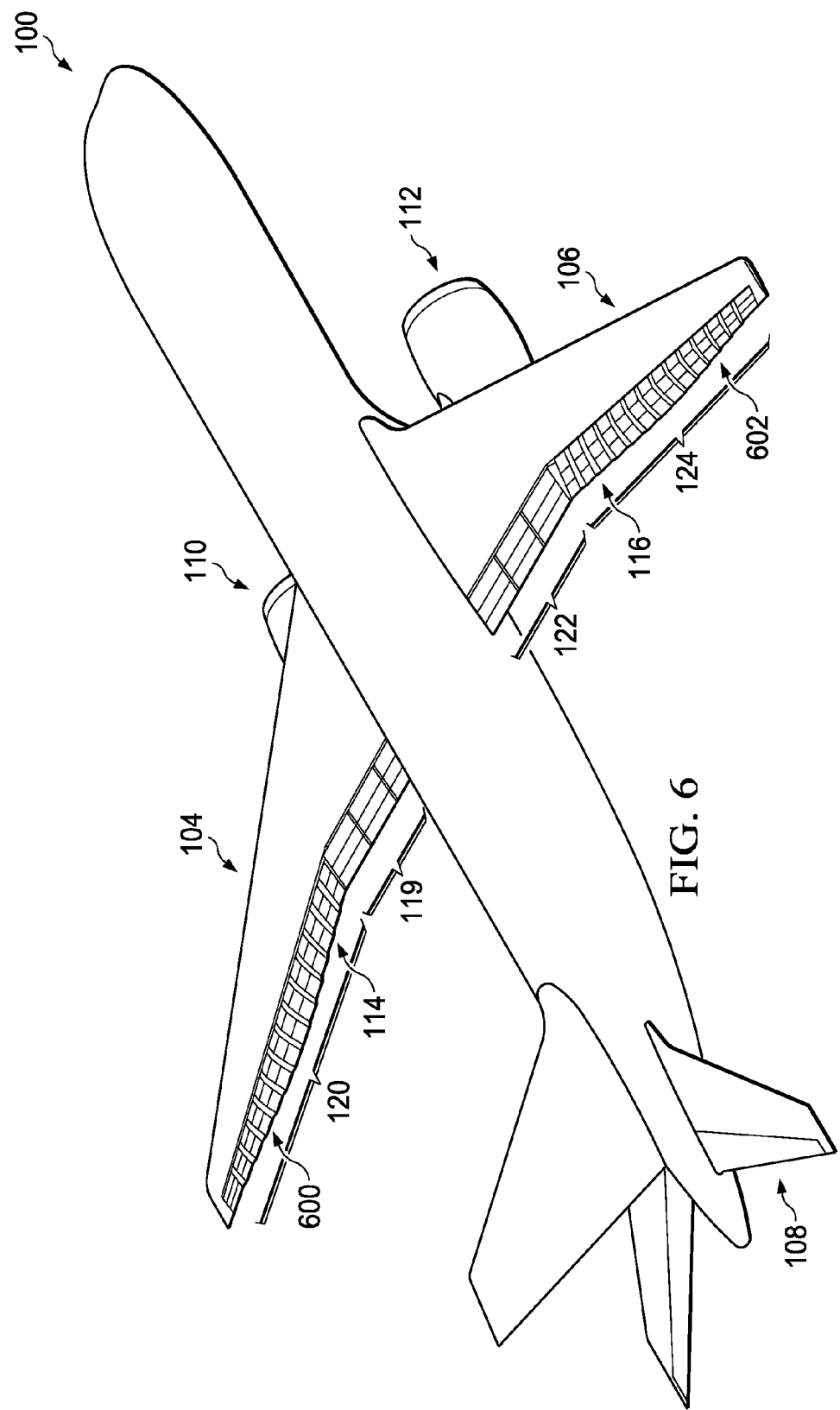
FIG. 6 is an illustration of a perspective view of an aircraft in accordance with an illustrative embodiment.

Turning now to FIG. 6, an illustration of a perspective view of aircraft 100 from FIG. 1 is depicted in accordance with an illustrative embodiment. In this illustrative example, aircraft 100 is in flight. Control surface 114 has shape 600 and control surface 116 has shape 602.

With control surface 114 having shape 600, wing 104 of aircraft 100 has a variable camber along wing 104. Further, with control surface 116 having shape 602, wing 106 of aircraft 100 has a variable camber along wing 106.

Figure 7:
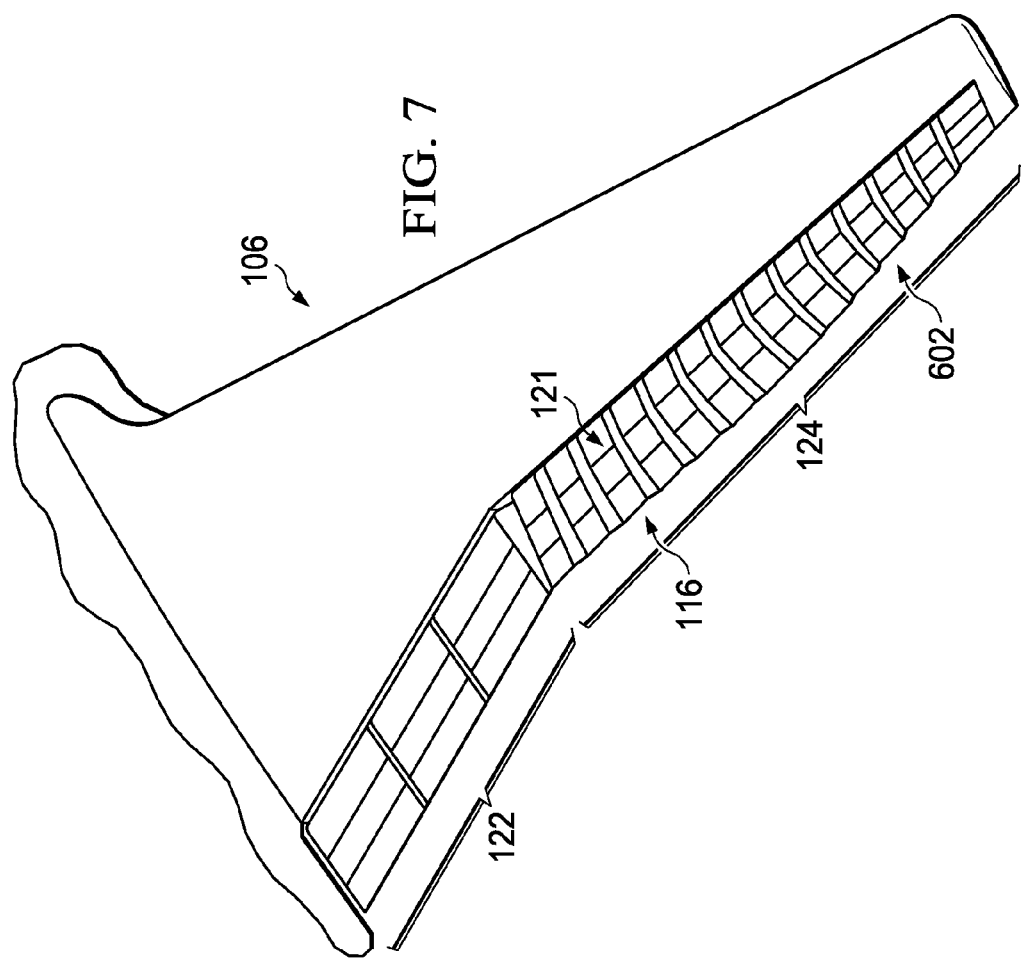
FIG. 7 is an illustration of a perspective view of a wing of an aircraft in accordance with an illustrative embodiment.

With reference now to FIG. 7, an illustration of a perspective view of wing 106 of aircraft 100 from FIG. 6 is depicted in accordance with an illustrative embodiment. As depicted, each of segments 121 has been moved independently of the other segments of control surface 116. In particular, each of segments 121 has been moved such that the curvature of the outer surface of each of segments 121 in the forward-aft direction is different from the curvature of the outer surfaces of the other segments of control surface 116.

Control surface 114 and control surface 116 are examples of implementations for a single substantially continuous and substantially smooth control surface that may be used to take the place of flaps and ailerons for wings of aircraft. These control surfaces may be used to improve the overall aerodynamic performance of aircraft.

The functionality provided by control surface 114 and control surface 116 may be achieved using any control surface comprising a plurality of segments, in which each of the plurality of segments has a number of sections. In particular, each segment of the plurality of segments may be moved independently of the other segments using an actuation system for that segment. This independent movement of a segment may be performed by moving each of the number of sections that form that segment independently of the other sections that form the segment using a section mechanism for that section.

The illustrations of aircraft 100 in FIGS. 1 and 6, wing 104 in FIG. 2, control surface 114 in FIGS. 1-7, and wing 106 with control surface 116 in FIGS. 1, 6, and 7 are not meant to imply physical or architectural limitations to the manner in which an illustrative embodiment may be implemented. Other components in addition to or in place of the ones illustrated may be used. Some components may be optional.

For example, a single control surface associated with wing 104 of aircraft 100 is shown in FIG. 1. However, in other illustrative examples, two or more control surfaces implemented in a manner similar to control surface 114 may be associated with wing 104.

Further, aircraft 100 from FIG. 1 is depicted as an airliner. However, in other illustrative examples, a control surface, such as control surface 114 or control surface 116 from FIG. 1, may be used on an aircraft in the form of a shuttle, an unmanned aerial vehicle, or some other type of aircraft.

Figure 8:
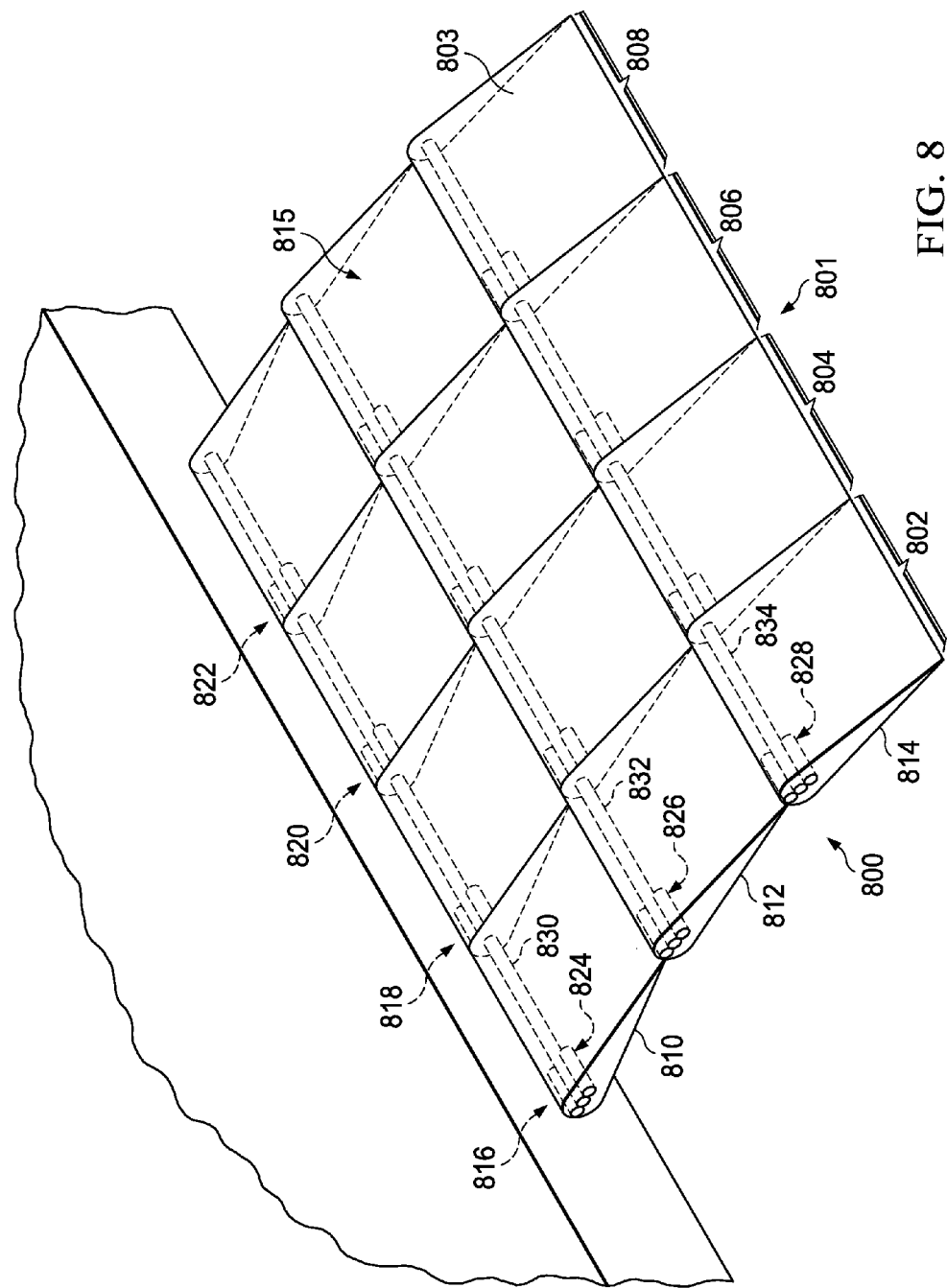
FIG. 8 is an illustration of a portion of a control surface in accordance with an illustrative embodiment.

With reference now to FIG. 8, an illustration of a portion of a control surface is depicted in accordance with an illustrative embodiment. In this illustrative example, control surface 800 is an example of another implementation for a control surface. Only a portion of control surface 800 is depicted in this example.

Control surface 800 comprises a plurality of segments 801 that form a portion of outer surface 803 of control surface 800. The plurality of segments 801 include segments 802, 804, 806, and 808. Each of segments 801 comprises a number of sections. In particular, each of segments 801 comprises three sections. For example, segment 802 comprises sections 810, 812, and 814.

In this illustrative example, shaping system 815 is associated with control surface 800. Shaping system 815 is considered part of control surface 800 in this example. Shaping system 815 is configured to control the shape of outer surface 803 of control surface 800. In particular, shaping system 815 is configured to control the curvature along outer surface 803 of control surface 800.

As depicted, shaping system 815 includes actuation systems 816, 818, 820, and 822 associated with segments 802, 804, 806, and 808, respectively. Each of these actuations systems is configured to move the corresponding segment with which the actuation system is associated. Further, each of these actuation systems includes a section mechanism for each section of the corresponding segment.

For example, actuation system 816 includes section mechanism 824, section mechanism 826, and section mechanism 828. Section mechanism 824 is configured to move section 810 independently of section 812 and section 814. Section mechanism 826 is configured to move section 812 independently of section 810 and section 814. Further, section mechanism 828 is configured to move section 814 independently of section 810 and section 812.

In this illustrative example, section mechanism 824, section mechanism 826, and section mechanism 828 comprise actuator 830, actuator 832, and actuator 834, respectively. Actuator 830, actuator 832, and actuator 834 take the form of shape-memory allow rotary actuators that use torque tubes, in this example.

The illustration of control surface 800 in FIG. 8 is not meant to imply physical or architectural limitations to the manner in which an illustrative embodiment may be implemented. Other components in addition to or in place of the ones illustrated may be used. Some components may be optional.

Figure 9:
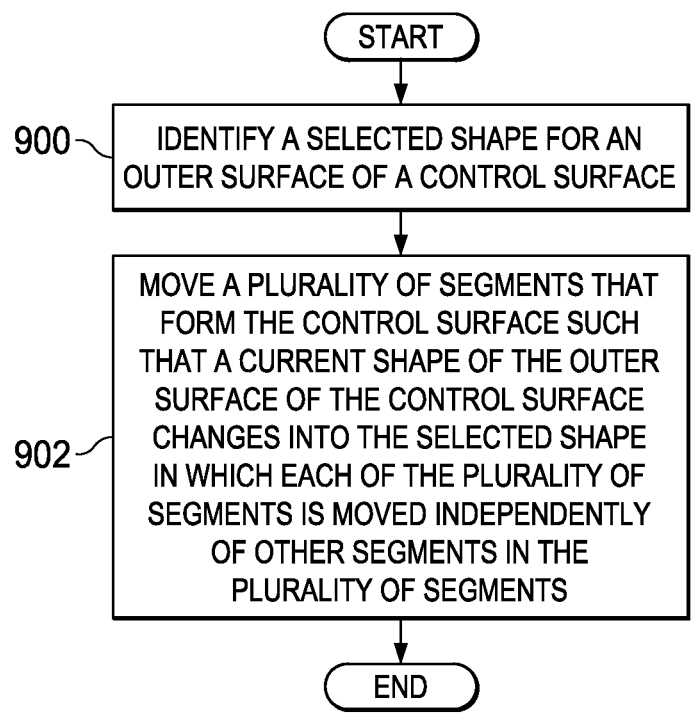
FIG. 9 is an illustration of a process for controlling a curvature of a control surface in the form of a flowchart in accordance with an illustrative embodiment.

With reference now to FIG. 9, an illustration of a process for controlling a curvature of a control surface is depicted in the form of a flowchart in accordance with an illustrative embodiment. The process illustrated in FIG. 9 may be implemented to control the curvature of a control surface such as, for example, without limitation, control surface 114 and/or control surface 116 in FIG. 1.

The process begins by identifying a selected shape for an outer surface of a control surface (operation 900). In operation 900, the control surface comprises a plurality of segments. Further, each of the plurality of segments comprises a number of sections.

The plurality of segments that form the control surface are moved such that a current shape of the outer surface of the control surface changes into the selected shape in which each of the plurality of segments is moved independently of other segments in the plurality of segments (operation 902), with the process terminating thereafter. In operation 902, each segment is moved by moving each of the number of sections that form that segment independently of the other sections that form the segment.

In particular, the number of sections that form a segment may be moved relative to each other such that the shape of the outer surface of the segment may be changed to a desired shape. For example, each section may be moved independently of the other sections until the outer surface of the segment has the desired curvature in the forward-aft direction. This curvature may vary along the forward-aft direction.

The flowchart described above illustrates the functionality and operation of some possible implementations of apparatuses and methods described in the different illustrative embodiments. In this regard, each block in the flowchart may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in the flowchart.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a control surface associated with a portion of an aft edge of a wing, wherein the control surface comprises:
a plurality of segments in which each of the plurality of segments comprises a number of sections; and
a shaping system associated with the control surface and configured to move each segment in the plurality of segments independently of other segments in the plurality of segments to control a shape of an outer surface of the control surface, such that each segment comprises a number of section mechanisms, such that each of the number of section mechanisms is configured to move a corresponding section in the number of sections independently of other sections in the number of sections.

2. The apparatus of claim 1, wherein the shaping system comprises:
a plurality of actuation systems, wherein each of the plurality of actuation systems is configured to move a corresponding segment in the plurality of segments independently of the other segments in the plurality of segments.

3. The apparatus of claim 2, wherein the actuation system in the plurality of actuation systems comprises at least one of a hydraulic actuator, a pneumatic actuator, a rotary actuator, a linear actuator, an electric actuator, a shape-memory alloy actuator, and a shape-memory alloy rotary actuator.

4. The apparatus of claim 1, wherein the number of sections includes three sections arranged along a forward-aft direction.

5. The apparatus of claim 1, wherein the plurality of segments comprises:
a plurality of inboard segments that form an inboard portion of the control surface; and
a plurality of outboard segments that form an outboard portion of the control surface.

6. The apparatus of claim 1 further comprising:
a plurality of elastomeric interfaces configured to form a portion of the outer surface of the control surface.

7. The apparatus of claim 6, wherein a first portion of the plurality of elastomeric interfaces are located between the plurality of segments and wherein a second portion of the plurality of elastomeric interfaces are located between the number of sections that form the each of the plurality of segments.

8. The apparatus of claim 6, wherein each of the plurality of elastomeric interfaces is comprised of an elastomeric material selected from one of rubber and a silicone rubber formation.

9. The apparatus of claim 1, wherein the shape of the outer surface of the control surface is controlled to control an overall shape of the wing.

10. A control surface comprising:
a plurality of segments in which each segment in the plurality of segments is configured to be moved independently of other segments in the plurality of segments to control a shape of an outer surface of the control surface, such that each segment comprises a number of section mechanisms, wherein each of the section mechanisms is configured to move a corresponding section in the number of sections independently of other sections in the number of sections; and
a plurality of elastomeric interfaces configured to form a portion of the outer surface of the control surface, wherein the outer surface of the control surface is substantially continuous and smooth.

11. The control surface of claim 10 further comprising:
a shaping system configured to move each segment in the plurality of segments independently of other segments in the plurality of segments to control the shape of the outer surface of the control surface.

12. The control surface of claim 11, wherein the shaping system comprises:
a plurality of actuation systems, wherein each of the plurality of actuation systems is configured to move a corresponding segment in the plurality of segments independently of the other segments in the plurality of segments.

13. The control surface of claim 12, wherein the actuation system in the plurality of actuation systems comprises at least one of a hydraulic actuator, a pneumatic actuator, a rotary actuator, a linear actuator, an electric actuator, a shape-memory alloy actuator, and a shape-memory alloy rotary actuator.

14. The control surface of claim 10, wherein a section mechanism in the number of section mechanisms is configured to move the number of sections relative to each other until the outer surface of the segment has a desired curvature along a forward-aft direction.

15. A method for controlling a shape of an outer surface of a control surface, the method comprising:
identifying a selected shape for the outer surface of the control surface, such that the control surface comprises a plurality of segments in which each of the plurality of segments comprises a number of sections, each section in the number of sections configured to move independently of any other section in the number of sections; and
moving the plurality of segments such that a current shape of the outer surface of the control surface changes into the selected shape, wherein each of the plurality of segments is moved independently of other segments in the plurality of segments.

16. The method of claim 15, wherein identifying a desired shape for the control surface comprises:
identifying the selected shape for the outer surface of the control surface, wherein the selected shape for the control surface comprises a varying curvature along the outer surface of the control surface.

17. The method of claim 15, wherein the step of moving the plurality of segments comprises:
moving each of the number of sections for a segment in the plurality of segments independently of other sections in the number of sections until an outer surface of the segment has a desired curvature.

18. The method of claim 17, wherein the step of moving the each of the number of sections for the segment comprises:
moving the each of the number of sections for the segment in the plurality of segments independently of the other sections in the number of sections until the outer surface of the segment has the desired curvature, wherein a number of elastomeric interfaces between the number of sections allow the outer surface of the segment to remain substantially continuous and smooth while the number of sections is moved.

* * * * *